United States Patent
Li et al.

(10) Patent No.: US 7,024,057 B2
(45) Date of Patent: Apr. 4, 2006

(54) OPTICAL DEVICE HAVING DUAL MICROSTRIP TRANSMISSION LINES WITH A LOW-K MATERIAL AND A METHOD OF MANUFACTURE THEREOF

(75) Inventors: Guoliang Li, Macungie, PA (US); Thomas G. B. Mason, Bethlehem, PA (US)

(73) Assignee: TriQuint Technology Holding Co., Hillsboro, OR (US)

(*) Notice: Subject to any disclaimer, the term of this patent is extended or adjusted under 35 U.S.C. 154(b) by 310 days.

(21) Appl. No.: 10/244,186

(22) Filed: Sep. 16, 2002

(65) Prior Publication Data

US 2004/0052442 A1    Mar. 18, 2004

(51) Int. Cl.
*G02F 1/01* (2006.01)
*G02F 1/035* (2006.01)

(52) U.S. Cl. .............................................. 385/3; 385/1
(58) Field of Classification Search .................... 385/1, 385/2, 3, 8, 130, 129, 40, 4; 359/301
See application file for complete search history.

(56) References Cited

U.S. PATENT DOCUMENTS

| | | | |
|---|---|---|---|
| 4,093,345 A | 6/1978 | Logan et al. | |
| 6,262,834 B1 * | 7/2001 | Nichols et al. | 359/301 |
| 6,310,700 B1 * | 10/2001 | Betts | 359/2 |
| 6,574,379 B1 * | 6/2003 | Miyazaki | 385/1 |
| 6,819,877 B1 * | 11/2004 | Carter et al. | 398/186 |
| 2002/0048421 A1 * | 4/2002 | Miyazaki | 385/1 |

OTHER PUBLICATIONS

Robert G. Walker; "High-Speed III-V Semiconductor Intensity Modulators"; IEEE Journal of Quantum Electronics, vol. 27, No. 3, Mar. 1991; pp. 654-667.

* cited by examiner

*Primary Examiner*—Thien M. Le
(74) *Attorney, Agent, or Firm*—Hitt Gaines P.C.

(57) ABSTRACT

The present invention provides an optical device. In one embodiment, the optical device includes an optical waveguide formed in or over a ridge located on a substrate. The optical device also includes a microstrip transmission line comprising a signal electrode and a ground electrode adjacent the ridge and a low-k dielectric material separating the signal and ground electrodes. The present invention also provides a method for making the optical device.

19 Claims, 5 Drawing Sheets

OPTICAL DEVICE HAVING DUAL MICROSTRIP TRANSMISSION LINES WITH A LOW-K MATERIAL AND A METHOD OF MANUFACTURE THEREOF

TECHNICAL FIELD OF THE INVENTION

The present invention is directed, in general, to optical devices and, more specifically, to an optical device having an optical waveguide formed over or in a ridge, a microstrip transmission line comprising a signal electrode and a ground electrode adjacent the ridge, and a low-k dielectric material separating the signal and ground electrodes.

BACKGROUND OF THE INVENTION

Optical communication systems have continued to gain popularity in today's data transmission markets. Primarily because of their fast transmission speed, small size and relatively precise manufacture, Optical communication systems incorporating numerous optical devices and assemblies have become the systems of choice for technology companies desiring high-speed information transmission capabilities. Accordingly, as the transfer of information becomes one of the most valuable commodities in the world, optical device manufacturers are eager to develop further improvements in optoelectronic technology.

One area relating to optical devices that has seen significant improvement in recent years is the modulation of optical signals before transmission across an optical network. More specifically, Mach-Zehnder modulators (MZM) fabricated using III–V semiconductor materials have gained continued popularity for high-speed optical fiber communication systems. Compared with an older lithium niobate (LiNbO$_3$) modulator, a III–V MZM is typically more compact, less expensive, and compatible with monolithic integration. Compared with a conventional electro-absorption modulator, a III–V MZM has zero or tunable chirp, broader optical bandwidth, and can modulate higher optical power. However, the electro-optic (EO) coefficient is relatively small for III–V materials. Due to this fact, the required modulation length for achieving low modulation voltage (V$_\pi$<5V) makes it difficult to achieve a wide operational bandwidth (e.g., 30–40 GHz). This compounds the challenge for III–V MZMs to achieve both low modulation voltage V$_\pi$ and wide bandwidth for 40 Gb/s applications.

There are two major types of III–V MZMs. One type is based on the linear electro-optic effect (EO). Since the linear EO coefficient is small for III–V materials, modulation waveguide length >1 cm is typically needed to obtain a low modulation voltage V$_\pi$. However, such a relatively long modulation waveguide usually contains a large modulation loading capacitance (C$_L$~4 pF), which makes it practically impossible to achieve the desired wide bandwidth operation mentioned above with a lumped-element electrode. As a result, push-pull operation and traveling-wave electrodes having a microwave transmission line coupled to the dual optical waveguides are usually designed for this type of III–V MZM. The series push-pull design for the two arms in an MZM often cuts the loading capacitance in half, to C$_L$~2 pF for the same modulation length, yet still achieving the same modulation voltage V$_\pi$. The use of traveling-wave electrodes can further distribute the capacitance over the separately designed transmission lines, which lay in parallel with the dual optical waveguides.

In such a design, modulation length (and its capacitance) on the optical waveguides are segmented and periodically connected with conductive bridges to the traveling-wave electrodes as capacitive loading C$_L$. The capacitive loading C$_L$ lowers the electrode (e.g., transmission line) impedance and the microwave propagation velocity through the modulator. If the lowered microwave impedance matches with the impedance of the external microwave source (usually about 50Ω), and the lowered microwave velocity matches with the optical group velocity, the microwaves and the modulated optical wave packet will co-propagate toward the same direction in pace. Thus, the modulation depth may be enhanced independent of microwave frequency and a wider operational bandwidth may be achieved.

Unfortunately, a typical III–V MZM using the push-pull scheme with traveling-wave electrodes still cannot safely meet the system requirement. The reported maximum performance for this kind of design is V$_\pi$=4.75 V, bandwidth ~40 GHz, with an electrode length of 1.7 cm. The total optical waveguide length, including optical couplers and other passive waveguide lengths, total more than 2 cm. From these results, those who are skilled in the art understand that the operational bandwidth for the traveling-wave MZM is thus limited by the residual impedance mismatch, velocity mismatch, microwave loss and other parasitic parameters. Although increasing the modulation length of the MZM may help lower the modulation voltage V$_\pi$, the operational bandwidth of the device will also be reduced.

Another type of III–V MZM uses multiple-quantum-well (MQW) as the active modulation layer based on quantum confined Stark effect (QCSE). This quadratic effect (which means that the index change is roughly proportional to the square of the change in electrical field) requires a relatively thin (e.g., 0.4 μm) active layer to provide a large electrical field. However, such a thin active layer typically leads to a large loading capacitance for the modulation waveguide (~1 pF/mm).

Although the required modulation length in such a device is desirably short (e.g., 0.5–1.0 mm) for a low modulation voltage V$_\pi$, a relatively long electrode (>0.5 cm) is usually required if the above-mentioned push-pull traveling-wave design is used. In such a device, the total optical waveguide length will be close to 1 cm. Unfortunately, while achieving a much shorter length, a large optical loss (e.g., >20 dB) typically occurs for this type of device. Therefore, a MQW type III–V MZM is usually designed as a lumped-element device, thus making large operational bandwidth difficult to achieve. For example, a typical maximum bandwidth achieved for this type of lumped-element device is ~15 GHz, with V$_\pi$~4.5 V. As a result, the application of the MQW type III–V MZM is usually limited to 10 Gb/s optical communication systems.

Accordingly, what is needed in the art is an optical modulation waveguide device capable of high bandwidth operation, while maintaining a relatively short overall length and a low modulation voltage V$_\pi$.

SUMMARY OF THE INVENTION

To address the above-discussed deficiencies of the prior art, the present invention provides an optical device. In one embodiment, the optical device includes an optical waveguide formed on a ridge located on a substrate. The optical device also includes a microstrip transmission line including ground and signal electrodes adjacent the ridge and having a low-k material located between the ground electrode and the signal electrode. The present invention also provides a method for manufacturing the optical device. Variations of these embodiments are explained in more detail below.

The foregoing has outlined an embodiment of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the present invention.

BRIEF DESCRIPTION OF THE DRAWINGS

For a more complete understanding of the present invention, reference is now made to the following detailed description taken in conjunction with the accompanying FIGUREs. It is emphasized that various features may not be drawn to scale. In fact, the dimensions of various features may be arbitrarily increased or reduced for clarity of discussion. In addition, it is emphasized that some circuit components may not be illustrated for clarity of discussion. Reference is now made to the following descriptions taken in conjunction with the accompanying drawings, in which.

DETAILED DESCRIPTION

Figure 1:
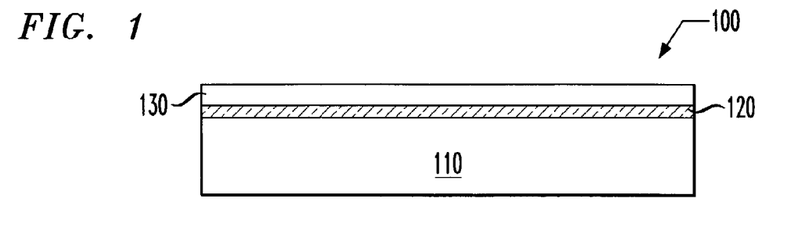
FIG. 1 illustrates a sectional view of one embodiment of an initial device early in a manufacturing process according to the principles of the present invention.

Referring initially to FIG. 1, illustrated is one embodiment of an initial device 100 early in a manufacturing process according to the principles of the present invention. The initial device 100 includes a semiconductor substrate 110, which in an exemplary embodiment, may be an N+ substrate 110 having a high dielectric constant (k). In a more specific embodiment, the substrate 110 may be an indium phosphate (InP) substrate 110, however other appropriate semiconductor materials, such as gallium arsenide (GaAs), may be employed.

Formed over the substrate 110 is an active modulation layer 120. The active modulation layer 120 may comprise, for example, indium/gallium/arsenide/phosphate (InGaAsP) bulk layers or InGaAsP/InP multiple quantum wells. However, other materials such as indium/gallium/aluminum/arsenide (InGaAlAs) bulk layers or InGaAlAs/InAlAs multiple quantum wells may also be used on an InP substrate. GaAs may be used as the active modulation layer 120 on a GaAs substrate. The substrate 110, as well as the active modulation layer 120 may be formed using conventional techniques, such as metalorganic chemical vapor deposition (MOCVD) or other conventional technique. Also illustrated in FIG. 1 is an optical buffer layer 130. In an advantageous embodiment, the optical buffer layer 130 comprises the same high-k material as the substrate 110. For example, the optical buffer layer 130 may also be InP, or other appropriate materials known to those who are skilled in the art.

Figure 2:
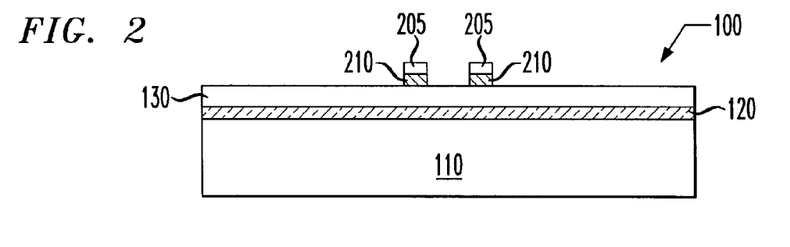
FIG. 2 illustrates a sectional view of one embodiment of the initial device of FIG. 1 after the formation of metal contacts.

Turning now to FIG. 2, illustrated is one embodiment of the initial device 100 of FIG. 1. A metal layer (not shown) is deposited and a photoresist (also not shown) is patterned. The photoresist is removed leaving photoresist masks 205 over the metal layer. The metal layer is conventionally etched to form metal contacts 210, which also leaves the optical buffer layer 130 exposed as illustrated. The metal contacts 210 will eventually provide an electrical coupling to the active modulation layer 120, which is discussed in greater detail below.

Another approach to forming the metal contacts 210 is to use a "lift-off" process. In the lift-off process, a photoresist layer (not illustrated) is deposited and patterned to form strip openings. A metal layer is then deposited over the patterned photoresist, and the photoresist is then removed. Metal on top of photoresist will be lifted off with the removal of the photoresist, leaving metal strips in the previously formed photoresist openings that form the metal contacts 210.

Figure 3:
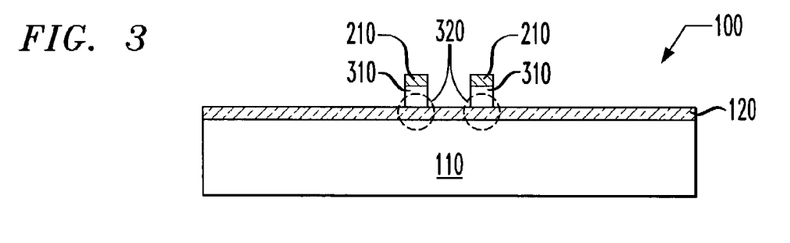
FIG. 3 illustrates a sectional view of one embodiment of the initial device of FIG. 2 after an initial etch step according to the process of the present invention.

Looking now at FIG. 3, illustrated is one embodiment of the initial device 100 of FIG. 2 after an initial etch step conducted according to the process of the present invention. More specifically, another etch is conducted which removes the exposed portions of the optical buffer layer 130 and forms contact towers 310. The metal pads and that portion of the optical buffer layer 130 that resides under the photoresist masks 205 are basically unaffected by the etch process. As seen from FIG. 3, the resulting contact towers 310 and metal pads 210 are seated on top of, and connected to, the active modulation layer 120. This configuration defines regions 320 in the active modulation layer 120 where optical waveguides are formed. Specifically, differing indices of refraction of the contact towers 310 and the substrate 110 providing optical confinement of the specific regions 320 of the active modulation layer 120. In this particular embodiment, these differing indices of refraction form waveguides similar to conventional rib waveguides. However, the waveguides may include other types of waveguides. For example, the waveguide regions 320 may include deep ridge waveguides or embedded strip waveguides formed by diffusing dopant into the waveguide ridge 410. It should be understood that in some embodiments, the waveguides need not be diffused in the substrate 110, but may be located over, which as used herein includes on, the substrate 110 instead.

Figure 4:
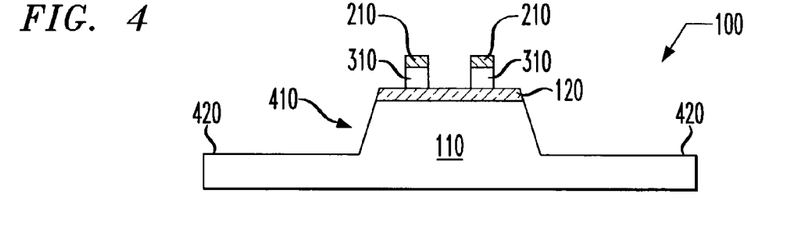
FIG. 4 illustrates a sectional view of one embodiment of the initial device of FIG. 3 after a second etch step according to the process of the present invention.

Referring now to FIG. 4, illustrated is one embodiment of the initial device 100 of FIG. 3 after a substrate etch step. The substrate etch, which in one embodiment may be a plasma etch, is performed to form a waveguide ridge 410 in the initial device 100. The substrate etch preferably includes depositing a mask and patterning a masking material, using conventional techniques. The etch is then performed on the substrate 110. As the etch is performed deeper into the substrate 110, in an exemplary embodiment, to a depth of about 2.0 µm, the waveguide ridge 410 begins to take shape. Typically the resulting shape is trapezoidal, which results from a horizontal attack by the etchant on the substrate. At the conclusion of the etching process, substrate ledges 420 adjacent the waveguide ridge 410 remain. In an advantageous embodiment, the sidewalls of the waveguide ridge 410 should be as perpendicular to the substrate 110 as possible.

Figure 5:
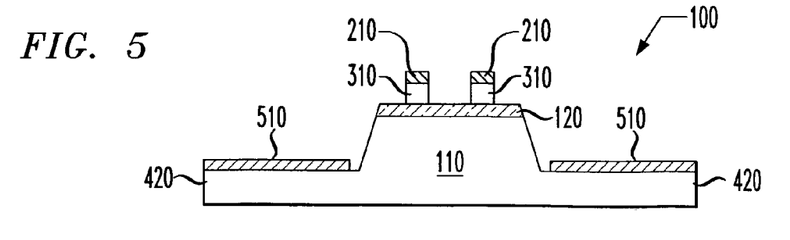
FIG. 5 illustrates a sectional view of one embodiment of the initial device of FIG. 4 after ground contacts have been formed.

Turning now to FIG. 5, illustrated is one embodiment of the initial device 100 of FIG. 4 after ground electrodes 510 have been formed using conventional deposition processes. The ground electrodes 510 are formed on the substrate ledges 420 adjacent the waveguide ridge 410 and are electrically connected to the optical waveguides through the conductive substrate 110. This serves as an electrical ground for microwave signals that modulate the optical signal in the waveguides of the initial device 100 during operation. In an exemplary embodiment, the ground electrodes 510 are formed using gold (Au), however the present invention is not limited to any particular conductor. Accordingly, any high-conductivity electrical conductor may be used to form the ground electrodes 510.

Figure 6:
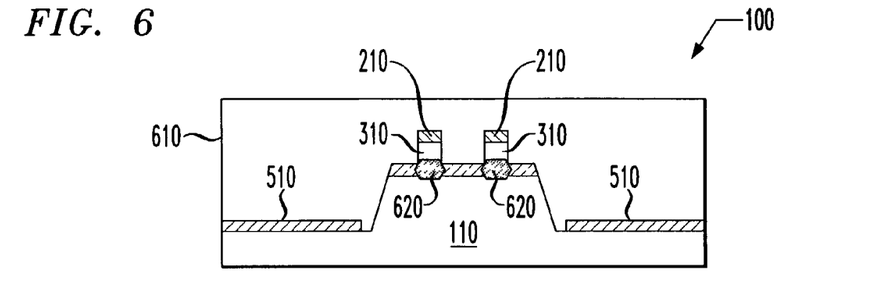
FIG. 6 illustrates a sectional view of one embodiment of the initial device of FIG. 5 after a deposition step according to the process of the present invention.

Turning now to FIG. 6, illustrated is one embodiment of the initial device 100 of FIG. 5 after a deposition step according to the process of the present invention. More specifically, a low-k material 610 is deposited over the initial device 100. For the purposes of the present invention, a "low-k" material is a material having a dielectric constant ($\in_\mu$) less than about 4. Examples of low-k materials that may be employed in the device 100 include air ($\in_\mu$~1), bisbenzocyclobutene (BCB) ($\in_\mu$~2.5) or polyimide ($\in_\mu$~3).

In one embodiment, the low-k material 610 is formed using a spin-on technique, however other conventional means of forming the low-k material, such as polymides, 610 may also be employed. In such embodiments, the transmission line may have a low pre-loading phase velocity index value (also called a "micro index") $n_\mu$ of about 1.4. With the formation of the low-k dielectric material 610 in place, waveguides 620 are formed by the differing indices of refraction in the low-k dielectric material 610, the contact towers 310, the substrate 110 and the active modulation layer 120, as discussed above.

Figure 7:
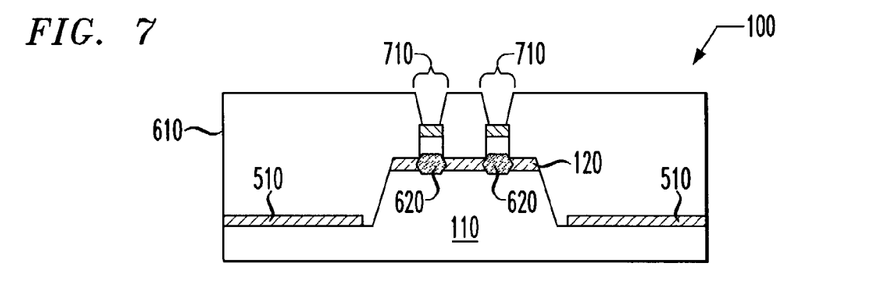
FIG. 7 illustrates a sectional view of one embodiment of the initial device of FIG. 6 after another etch according to the process of the present invention.

Referring now to FIG. 7, illustrated is one embodiment of the initial device 100 of FIG. 6 after another etch according to the process of the present invention. At this point in the manufacturing process, the low-k material 610 is masked and patterned so that vias 710 may be etched therein. As illustrated, the vias 710 are etched down to the metal contacts 210 in order to make contact therewith. As before, any conventional etching technique may be employed, such as chemical etching, and the present invention is not limited to any particular technique.

Figure 8:
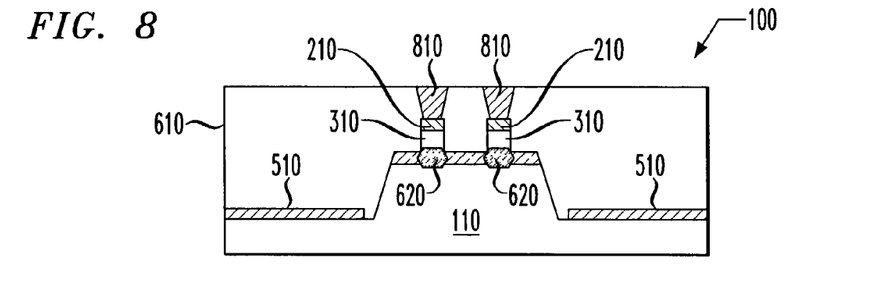
FIG. 8 illustrates a sectional view of one embodiment of the initial device of FIG. 7 after plugs have been formed in the cavities shown in FIG. 7.

Turning now to FIG. 8, illustrated is one embodiment of the initial device 100 of FIG. 7 after electrode contacts 810 have been formed in the vias 710 shown in FIG. 7. The electrode contacts 810 are formed by depositing a conductive material into the vias 710 etched in the low-k material 610. Thermal evaporation, or other beneficial technique, may be used to form the electrode contacts 810. After formation of the electrode contacts 810, a substantially planar top surface is provided for the initial device 100.

Figure 9:
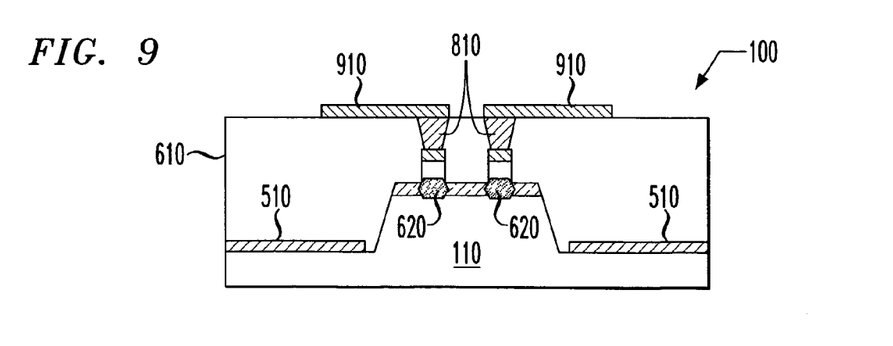
FIG. 9 illustrates a sectional view of one embodiment of the initial device of FIG. 8 after metal bridges have been formed on the device.

Looking now at FIG. 9, illustrated is one embodiment of the initial device 100 of FIG. 8 after discrete metal bridges 910 have been formed on the initial device 100. As illustrated, the metal bridges 910 are formed over the low-k material 610, and in contact with the electrode contacts 810. As a result, the metal bridges 910 are electrically coupled to the metal contacts 210 formed over the active modulation layer 120 of the waveguide ridge 410. Therefore, as microwave signals travel along the completed transmission line electrodes, an electrical field will be conducted to the optical waveguides 620 through the metal bridges 910 and perform optical modulation of the optical signal in the waveguides 620. Also, in an exemplary embodiment, the metal bridges 910 are spaced periodically along a length of the initial device 100 to correspond with periodically spaced electrode contacts 810 extending the length of the waveguides 620 formed in the active modulation layer 120. This periodic spacing of the electrode contacts 810 coupled to portions of the waveguides 620 provide a lower modulation capacitance for a given modulator length when compared to a continuous electrode modulator.

Figure 10:
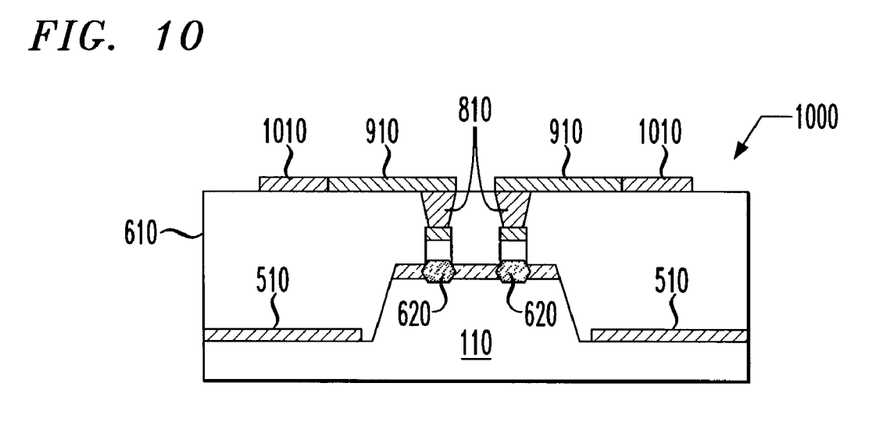
FIG. 10 illustrates a sectional view of one embodiment of a completed modulator device manufactured according to the method of the present invention described above.

Referring to FIG. 10, illustrated is one embodiment of a completed modulator device 1000 manufactured according to the method of the present invention described above. As mentioned above, in an exemplary embodiment, the modulator device 1000 may be an MZM waveguide device. In a more specific embodiment, the modulator device 1000 may be a push-pull MZM waveguide device, such as a differential push-pull MZM waveguide device.

To complete the modulator device 1000, signal electrodes 1010 are formed over the low-k material 610, and thus over the ground electrodes 510. Specifically, the signal electrodes 1010 and the ground electrodes 510 form a complete microstrip (microwave) transmission line for the modulator device 1000. The signal electrodes 1010 extend along a length of the modulator device 1000 and are coupled to the plurality of metal bridge 910. In an advantageous embodiment, the signal electrodes 1010 are composed of gold, however other appropriate conductive material may also be employed. In addition, the signal electrodes 1010 may be formed using conventional techniques. In embodiments of the invention where the low-k material 610 is air, the signal electrodes 1010 and the bridges 910 may be suspended above the ground electrodes 510 and attached to the modulator device 1000 via the electrode contacts 810.

By connecting the optical waveguides 620 to the microwave transmission lines (formed by the signal electrodes 1010 and the ground electrodes 510) through the periodically placed metal bridges 910, microwave signals propagating in the microwave transmission lines will modulate the optical signals periodically. To achieve the lower modulation voltage $V_\pi$ typically needed for optical on/off switching, a larger portion of optical waveguides 620 (thus more capacitance) have to be connected to the microwave transmission lines. It is highly desirable to load more capacitance with short transmission lines (thus, a short device) for maintaining wide bandwidth and low optical loss. The present invention designs the microwave transmission lines as microstrip structures filled with low-k material. This allows loading more capacitance per unit length of microwave transmission lines, as explained in greater detail below, while achieving a small modulation voltage $V_\pi$, wide bandwidth, and low optical loss simultaneously in a short device.

To understand how the structure provided by the present invention allows the loading of more capacitance, without extending the length of the modulator device 1000, the operation of a conventional push-pull traveling-wave modulator is first explored. However, the present invention is not intended to be limited by any theory of operation. For microwave transmission lines in the traveling-wave modulator devices, the microwave impedance and phase velocity index, before and after capacitive loading, may be calculated using equations (1) and (2):

$$\text{Before loading: } Z_\mu = \sqrt{\frac{L_\mu}{C_\mu}}, n_\mu = c\sqrt{L_\mu C_\mu} \quad (1)$$

$$\text{After loading: } Z_0 = \sqrt{\frac{L_\mu}{C_\mu + C_L}}, n_0 = c\sqrt{L_\mu(C_\mu + C_L)} \quad (2)$$

where $Z_\mu$ and $C_\mu$ are the inductance and capacitance, respectively, per unit-length for an unloaded transmission line. In addition, $C_L$ is the loaded capacitance per unit-length, and c, which is approximately $3\times10^{10}$ cm/s, is the velocity of light in a vacuum. $Z_\mu$ and $n_\mu$ are the microwave impedance and phase velocity index values before capacitance loading $C_L$, and $Z_0$ and $n_0$ are the corresponding values after loading.

A conventional traveling-wave modulator device typically requires its post-loading microwave impedance $Z_0$ to match the impedance of an external microwave source of the device, for example, 25Ω or 50Ω. In addition, the post-loading phase velocity index no should typically match the optical group velocity index in the optical waveguides 620, for example, 3.4–3.6 for III–V material. The matching requirements determine how much capacitance per unit length (e.g., $C_L$) may be loaded on the transmission line, since the amount of capacitance loaded is used to slow down the phase velocity so that it matches the optical group velocity index. Equation (3) sets forth this relationship:

$$C_L = \frac{n_0^2 - n_\mu^2}{cZ_0 n_0} \quad (3)$$

A conventional III–V traveling-wave MZM device usually has both the signal electrode and the ground electrode of its transmission line positioned on top of the III–V substrate. The positioning of the transmission line typically results in about one-half of the microwave field propagating along the transmission line to manifest itself in the substrate, while the other half of the microwave field manifests in the air. Equation (4) may be used to help solve equation (3) for such a conventional device because of the division of the microwave field in the substrate and air.

$$n_\mu^2 = \frac{(\varepsilon_{\mu_{substrate}} + \varepsilon_{\mu_{air}})}{2} \quad (4)$$

A substrate comprised of III–V material has a dielectric constant ($\varepsilon_\mu$) of about 13, and air has a dielectric constant ($\mu_\mu$) of about 1.

Assuming a typical post-loading microwave impedance of $Z_0$=50Ω, a post-loading phase velocity index of $n_0$=3.4~3.6, and a pre-loading phase velocity index of $n_\mu$=2.65 (using equation (4)), equation (3) may be used to calculate a loading capacitance per unit length for the conventional device of $C_L$=0.9 to 1.1 pF/cm. As mentioned before, the loading value $C_L$ determines the electrode length for a completed modulator device, such that enough portion of optical waveguide on the device is modulated to achieve a desirably low modulation voltage $V_\pi$. For the purposes of the present invention, a "low modulation voltage $V_\pi$" is a modulation voltage no greater than 3 volts. Increasing $C_L$ may also make the required electrode length shorter, which directly leads to wide bandwidth while maintaining a low modulation voltage $V_\pi$. As equation (3) represents, the loading capacitance $C_L$ is determined by post-loading microwave impedance of $Z_0$, post-loading phase velocity index of $n_0$, and pre-loading phase velocity index of $n_\mu$. Since the post-loading phase velocity index of $n_0$ typically should match the optical group velocity index, as mentioned above, post-loading microwave impedance of $Z_0$ and pre-loading phase velocity index of $n_\mu$ may be decreased to provide an increased $C_L$.

Figure 11:
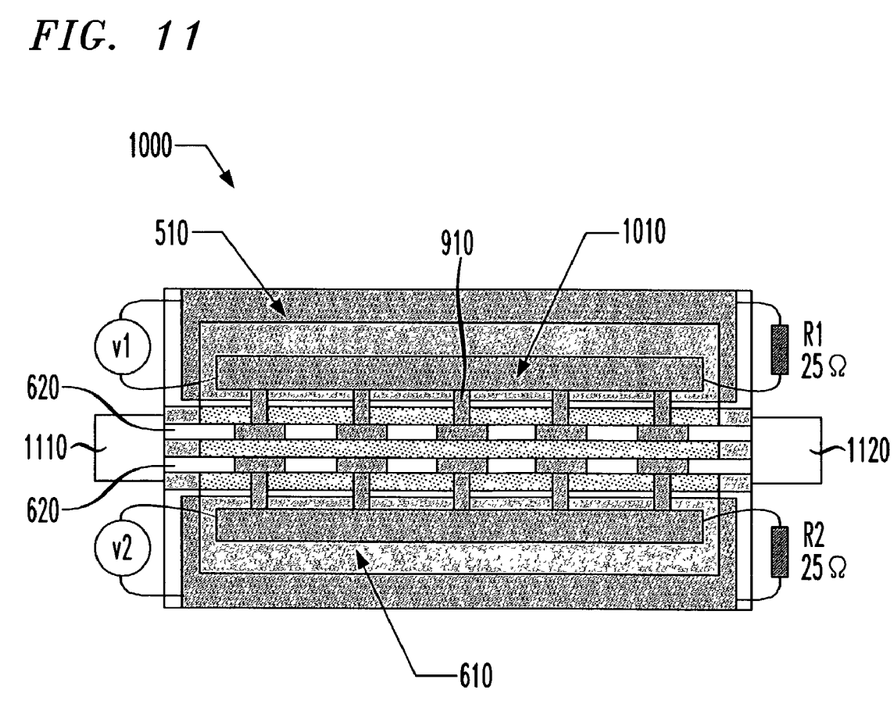
FIG. 11 illustrates a top view of the completed optical device illustrated in FIG. 10.

Referring to FIG. 11, illustrated is a top view of the completed optical modulator device 1000 illustrated in FIG. 10, and manufactured in accordance with the principles of the present invention. In the embodiment illustrated in FIG. 11, the modulator device 1000 is constructed as a differential push-pull modulator. This may be seen from the first and second differential voltages v1, v2 and first and second resistors R1, R2 coupled across the ground and signal electrodes 510, 1010 of the transmission signal lines of the device 1000. Also illustrated in this dual waveguide embodiment are an optical signal splitter 1110 and an optical signal combiner 1120 for splitting and then re-combining, respectively, optical signals transmitted through the modulator device 1000.

As mentioned above, the low-k material 610 is filled in between the ground and signal electrodes 510, 1010 of the microstrip transmission lines. Examples of low-k materials that may be employed in the device 1000 include air ($\varepsilon_\mu$~1), BCB ($\varepsilon_\mu$~2.5), or polymide ($\varepsilon_\mu$~3). As a result of this stacked construction, most of the electrical field present during operation is confined in the low-k material 610. Thus, equation (4) is no longer valid for a microstrip transmission line constructed according to the present invention, since most field is now confined in low-k material. As a result, the new equation becomes:

$$n_\mu^2 = \varepsilon_\mu \quad (5)$$

where $\varepsilon_\mu$ is the dielectric constant of the low-k material 610 located between the ground and signal electrodes 510, 1010. It should be noted that the result of equation (5) is slightly less because a small portion of electrical field leaks into air. As discussed above, lowering the pre-loading phase velocity index $n_\mu$ results in an increase in loading capacitance $C_L$, see equation (3), assuming other variables remain unchanged.

Employing the low-k material 610 in accordance with the principles described herein typically results in a decreased post-loading microwave impedance of $Z_0$ as well. More specifically, as set forth in equation (6), choosing a desired post-loading microwave impedance of $Z_0$, and knowing the pre- and post-loading phase velocity indexes $n_0$, $n_\mu$ provides a target pre-loading microwave impedance of $Z_\mu$ to implement into the modulator device 1000.

$$Z_\mu = Z_0 \times \frac{n_0}{n_\mu} \tag{6}$$

For example, if a low $Z_0=25\Omega$ is desired in order to increase the loading capacitance $C_L$ of the modulator device 1000, where $n_0=3.4$ and $n_\mu=1.4$, a pre-loading microwave impedance of $Z_\mu=61\Omega$ may be employed in the manufacture of the modulator device 1000. Then, using equation (3), a loading capacitance $C_L$ of about 4 pF/cm may be achieved. When compared to the loading capacitance of $C_L=0.9$ to 1.1 pF/cm of a conventional modulator, a modulator device constructed according to the principles of the present invention may load four times the capacitance for a given length when compared to a similar conventional device. Furthermore, by providing such a large increase in loading capacitance $C_L$, the overall length of the modulator device 1000 may be significantly decreased to about 1 cm, such that a larger bandwidth on the order of about 40 GHz, together with a low modulation voltage $V_\pi$ on the order of about 2.5V, may be achieved at such a length. The device optical loss will also be greatly reduced.

In an exemplary embodiment, the length of the signal electrodes 1010 for a III–V MZM device based on an electro-optic (E/O) effect of the active modulation layer 120, and constructed according to the present invention, would be less than 1 cm to achieve $V_\pi=2.5V$ and an operational bandwidth of about 40 GHz. In another embodiment, the length of the signal electrodes 1010 for a III–V MZM device based on a quantum confined Stark effect (QCSE) of the active modulation layer 120 would be much more compact, on the order of about 0.2 cm, to achieve $V_\pi=2.5V$. In addition, in this embodiment the operational bandwidth would also be significantly increased to about 60 GHz. As a result, either embodiment provides an improved optical modulator for use in high-speed communications networks, such as a 40 Gb/s data transmission network.

Figure 12:
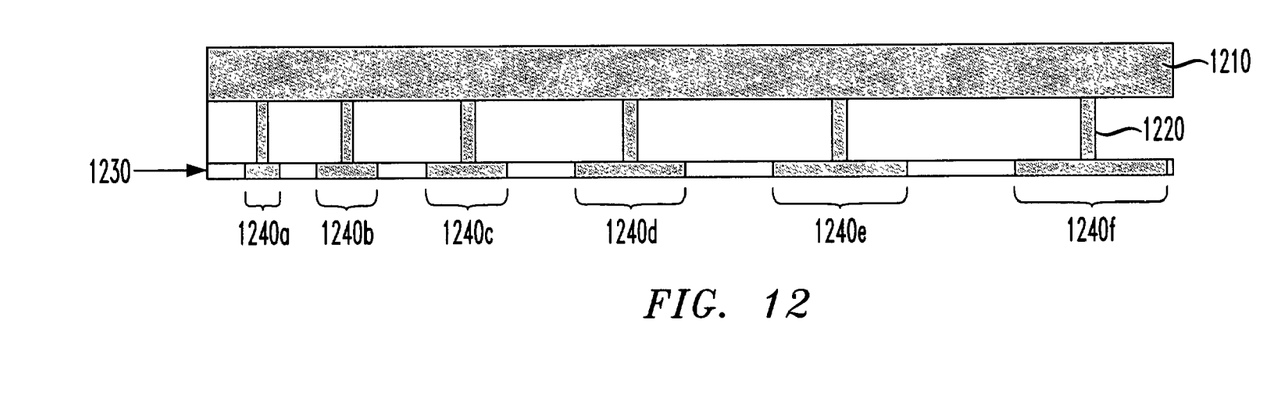
FIG. 12 illustrates a top view of an alternative embodiment of one-half of a microwave transmission signal line of an optical waveguide device constructed according to the principles of the present invention.

Looking now at FIG. 12, illustrated is an alternative embodiment of a portion of a microwave transmission line 1200 of an optical modulator constructed according to the principles of the present invention. The microwave transmission line 1200 includes a signal electrode 1210 and a plurality of spaced bridges 1220 coupled to an optical waveguide 1230. The signal electrode 1200 may be used in the modulation of optical signals passing through the waveguide 1230, in accordance with conventional practice.

Although a modulator manufactured according to the principles disclosed herein may provide the several benefits discussed above, further improvement in the modulation frequency response of the modulator may still be desirable. However, various limiting factors to the operational bandwidth of a modulator constructing according to the present invention may still exist. More specifically, these factors may include not only the residual impedance mismatch, velocity index mismatch, and microwave loss mentioned above, but also an electrical low-pass filtering effect caused by the periodic capacitive-loading provided by the periodically spaced electrode contacts typically present in an optical modulator.

Those who are skilled in the art understand that the electrical low-pass filtering effect to the modulation bandwidth is primarily caused by the periodic capacitive-loading provided by the periodically spaced electrode contacts 810 coupled to the signal electrode 1210 with the plurality of spaced bridges 1220. In a conventional layout, the uniformly distributed electrode contacts typically enhance the filtering effect and create poles in the filter characteristics. Such a filtering effect results in preventing microwave power above a certain frequency from traveling through the transmission line 1200 and modulating the optical waveguide 1230. Rather, the portion of microwave power is just filtered out. Therefore, modulation at frequencies above such frequency limits would not be available. In turn, the limitation in frequency modulation leads to a limit in the modulation bandwidth of the modulator device.

Thus, to combat the detrimental effects of such a uniform spacing of electrode contacts, one embodiment of a modulator constructed according to the present invention may include a plurality of non-uniform electrode contacts 1240a–1240f. In such an embodiment, laying-out the non-uniform electrode contacts 1240a–1240f in a predetermined manner helps achieve a wider modulation bandwidth by changing the filter properties of the transmission line 1200, and increasing the pass-band of the electrical filter in the transmission line 1200 to a higher frequency. It should be noted that in an even more advantageous embodiment, the length and distribution of the electrode contacts 1240a–1240f may be the same for both of the microwave transmission lines, so that a push-pull operation of the modulator may be maintained.

In the illustrated embodiment, the spacing and the active length in each electrode contact 1240a–1240f are increased linearly from the microwave source to the termination. However, other embodiments of the present invention may include alternative distribution schemes for the electrode contacts 1240a–1240f in order to non-uniformly distribute the loading of the active modulation length. For example, the active length of the electrode contacts 1240a–1240f, as well as the spacing therebetween, may be decreased linearly. Alternatively, the length and spacing could be increased or decreased following a particular function, such as an exponential or sinusoidal function. In yet another embodiment, the length and spacing could be arranged in alternative long and short electrode contacts along the waveguide 1230. In addition, the minimum modulation length that may be used could be as small as a few micrometers or as large as 1 mm, limited by the shortest microwave wavelength in the modulation signal.

Figure 13:
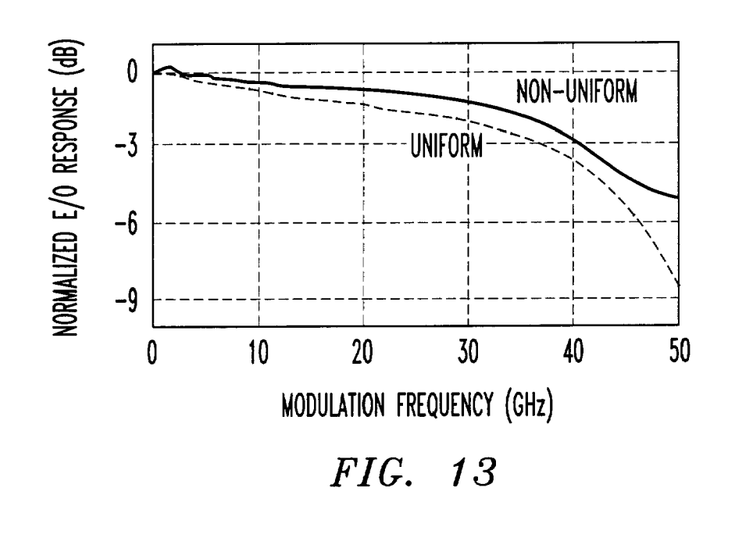
FIG. 13 illustrates a plot of an exemplary calculated modulation frequency response curve generated using the embodiment of the present invention illustrated in FIG. 12.

Referring now to FIG. 13, illustrated is a plot of an exemplary calculated modulation frequency response curve generated using the embodiment of the present invention illustrated in FIG. 12. As illustrated, the plot includes a dotted line that represents the modulation frequency response for uniform electrode contacts. Conversely, a solid line represents the modulation frequency response for the non-uniform electrode contacts 1240a–1240f shown in FIG. 12. By using the non-uniformly distributed traveling-wave electrode design of the present invention, the electrical low-pass filtering effect typically present in a modulator may be reduced and the modulation bandwidth increased. The calculated E/O frequency response of the non-uniform electrode contacts 1240a–1240f is about a 4 GHz bandwidth improvement over the conventional uniform layout. In addition, experimentation has generated about 10–20% larger bandwidth using the non-uniform layout of the present invention, depending on the structure of the modulator. Moreover, the non-uniform layout provided in this embodiment of the present invention may be employed in III–V MZMs, however it may also be employed in other types of traveling wave modulators, as well, while retaining the benefits described above.

Figure 14:
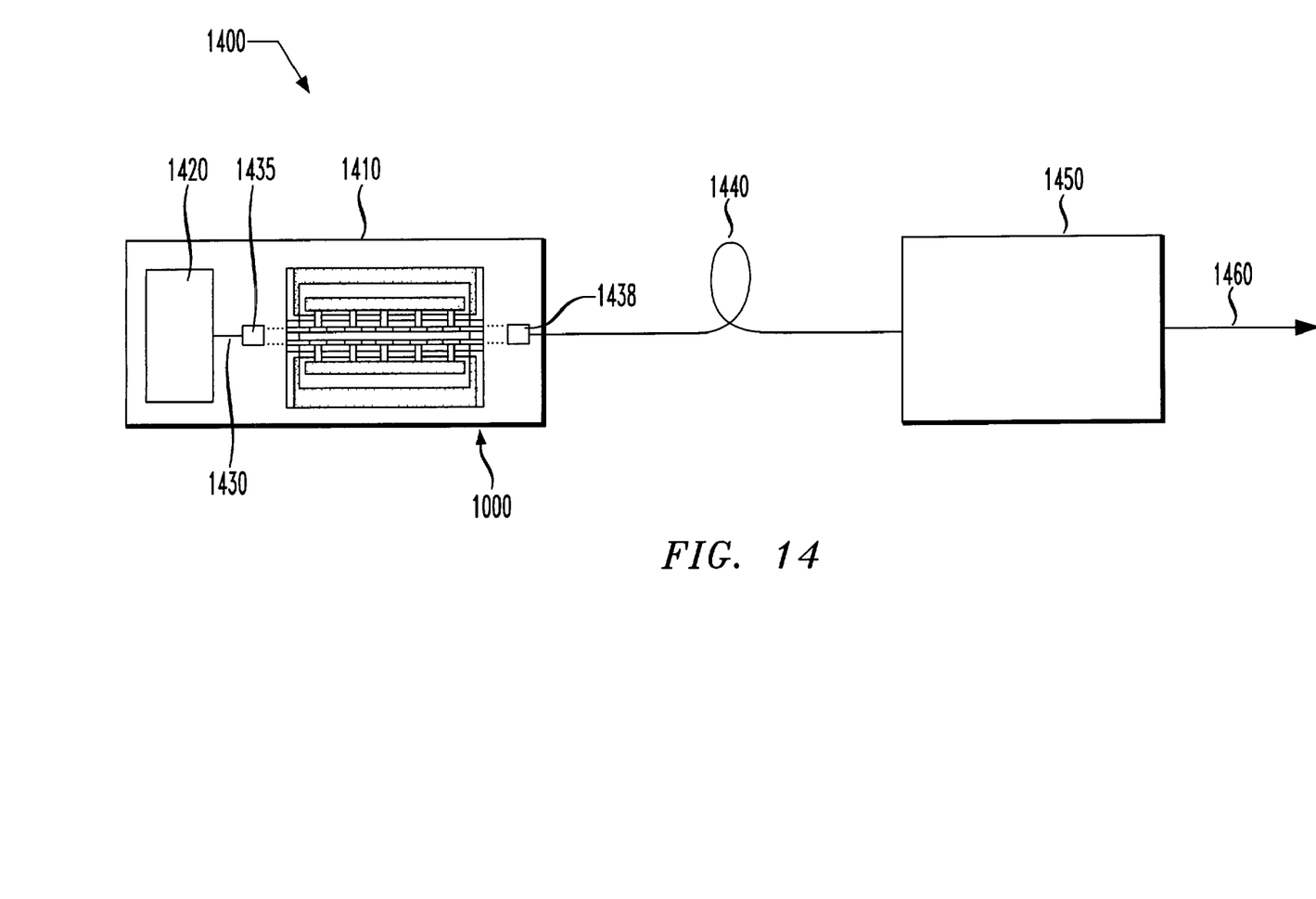
FIG. 14 illustrates one embodiment of an optical communications system, which may form one environment for an optical modulator of the present invention.

Turning finally to FIG. 14, illustrated is one embodiment of an optical communications system 1400, which may form one environment for the optical modulator device 1000 of the present invention. An optical transmitter 1410 uses a laser source 1420 to generate optical power in the form of an initial optical signal 1430. The initial optical signal 1430 is then split with an optical signal splitter 1435, and then the split signals are fed into a modulator to be modulated into a final optical signal. In the illustrated embodiment, the modulator is the modulator device 1000 of the present invention. The modulator device 1000 modulates the split optical signals into modulated signals that are combined by an optical signal combiner 1438 into the single final optical signal. The combined final optical signal is then transmitted across an optical fiber 1440 to a receiver 1450. The receiver 1450 receives information based on the modulated final optical signal, addresses the information as needed, and sends an output signal 1460. Although the modulator device 1000 is illustrated within the transmitter 1420, the modulator device 1000 may also be included in other appropriate locations in the optical communications system 1400, including packaging the modulator device 1000 with the receiver 1450 to form an optical transceiver. The optical communications system 1400 is also not limited to the devices previously mentioned. For example, the optical communications system 1400 may include other elements, such as a laser, diode, optical amplifier, photodetectors, or other similar device.

Although the present invention has been described in detail, those skilled in the art should understand that they can make various changes, substitutions and alterations herein without departing from the spirit and scope of the invention in its broadest form.

What is claimed is:

1. An optical device, comprising:
    an optical waveguide formed over or in a ridge located on a substrate;
    a microstrip transmission line comprising a signal electrode and a ground electrode adjacent said ridge; and
    a low-k dielectric material separating said signal and ground electrodes,
    wherein a length of said optical device is about 1 cm, when said device includes a capacitance loading of about 4 pF/cm, an operational bandwidth of at least about 40 GHz at −3 dB, and a modulation voltage ($V_\pi$) of about 2.5V or less.

2. An optical device, comprising:
    an optical waveguide formed over or in a ridge located on a substrate;
    a microstrip transmission line comprising a signal electrode and a ground electrode adjacent said ridge; and
    a low-k dielectric material separating said signal and ground electrodes,
    wherein said microstrip transmission line includes a plurality of electrode contacts located over said optical waveguide and having varying lengths.

3. A method of manufacturing an optical device, comprising:
    forming an optical waveguide over or in a ridge located on a substrate;
    forming a microstrip transmission line having a ground electrode and signal electrode adjacent said ridge, including locating a low-k material between said ground electrode and said signal electrode; and
    manufacturing said optical device with a length of about 1 cm, when said device includes a capacitance loading of about 4 pF/cm, an operational bandwidth of at least about 40 GHz at −3 dB, and a modulation voltage ($V_\pi$) of about 2.5V or less.

4. A method of manufacturing an optical device, comprising:
    forming an optical waveguide over or in a ridge located on a substrate; and
    forming a microstrip transmission line having a ground electrode and signal electrode adjacent said ridge, including locating a low-k material between said ground electrode and said signal electrode, wherein forming said microstrip transmission line includes forming a plurality of signal electrode contacts located over said optical waveguide and having varying lengths.

5. An optical transmitter, comprising:
    an optical source configured to generate an optical signal;
    an optical modulator coupled to said optical source and configured to modulate said optical signal, said optical modulator including:
        an optical waveguide formed over or in a ridge located on a substrate;
        a microstrip transmission line comprising a signal electrode and a ground electrode adjacent said ridge; and
        a low-k dielectric material separating said signal and ground electrodes; and
    an optical fiber coupled to said optical modulator and configured to carry said modulated optical signal,
    wherein a length of said optical modulator is about 1 cm, when said optical modulator includes a capacitance loading of about 4 pF/cm, an operational bandwidth of at least about 40 GHz at −3 dB, and a modulation voltage ($V_\pi$) of about 2.5V or less.

6. An optical transmitter, comprising:
    an optical source configured to generate an optical signal;
    an optical modulator coupled to said optical source and configured to modulate said optical signal, said optical modulator including:
        an optical waveguide formed over or in a ridge located on a substrate;
        a microstrip transmission line comprising a signal electrode and a ground electrode adjacent said ridge; and
        a low-k dielectric material separating said signal and ground electrodes; and
    an optical fiber coupled to said optical modulator and configured to carry said modulated optical signal,
    wherein said microstrip transmission line includes a plurality of electrode contacts located over said optical waveguide and having varying lengths.

7. An optical device, comprising:
    an optical waveguide formed over or in a ridge located on a substrate;
    a microstrip transmission line adjacent said ridge and having ground and signal electrodes and a low-k material located therebetween; and
    a plurality of electrode contacts located over said optical waveguide and having varying lengths.

8. The optical device as recited in claim 7, wherein said varying lengths are arranged along a length of said optical waveguide in a manner selected from the group consisting of:
   linearly;
   exponentially; and
   sinusoidally.

9. The optical device as recited in claim 7 wherein said signal electrode is formed over said substrate and said ground electrode.

10. The optical device as recited in claim 7 wherein a length of said optical device is about 1 cm, when said device includes a capacitance loading of about 4 pF/cm, an operational bandwidth of at least about 40 GHz at −3 dB, and a modulation voltage ($V_\pi$) of about 2.5V or less.

11. The optical device as recited in claim 9 wherein said optical device includes a parallel pair of micro strip transmission lines and optical waveguides.

12. The optical transmitter as recited in claim 11 wherein said optical device is a dual optical waveguide device and said parallel pair of microstrip transmission lines are dual microstrip transmission lines having a pair of parallel optical waveguides located therebetween.

13. The optical device as recited in claim 7 wherein said optical device is a modulator that forms at least a portion of an optical transmitter, further including an optical source optically coupled to said modulator.

14. A method of manufacturing an optical device, comprising:
   forming an optical waveguide over or in a ridge located on a substrate; and
   forming a microstrip transmission line having a signal electrode and ground electrode adjacent said ridge and including placing a low-k material therebetween; and
   forming a plurality of electrode contacts located over said optical waveguide and having varying lengths.

15. The method as recited in claim 14 wherein forming a microstrip transmission line includes forming a signal electrode including a plurality of electrode contacts having varying lengths arranged along a length of said optical waveguide in a manner selected from the group consisting of:
   linearly;
   exponentially; and
   sinusoidally.

16. The method as recited in claim 14 wherein forming a microstrip transmission line includes forming a signal electrode over said substrate and said ground electrode.

17. The method as recited in claim 14, further including manufacturing said optical device with a length of about 1 cm, when said device includes a capacitance loading of about 4 pF/cm, an operational bandwidth of at least about 40 GHz at −3 dB, and a modulation voltage ($V_\pi$) of about 2.5V or less.

18. The method as recited in claim 14 wherein forming a microstrip transmission line includes forming a parallel pair of microstrip transmission lines and optical waveguides.

19. The method as recited in claim 18 wherein forming a parallel pair of microstrip transmission lines and optical waveguides includes forming a dual optical waveguide device wherein said parallel pair of microstrip transmission lines form parallel microstrip transmission lines having a pair of parallel optical waveguides located therebetween.

* * * * *